T. W. FELSTEAD.
METER RECEPTACLE.
APPLICATION FILED APR. 12, 1915.
1,158,471.
Patented Nov. 2, 1915.
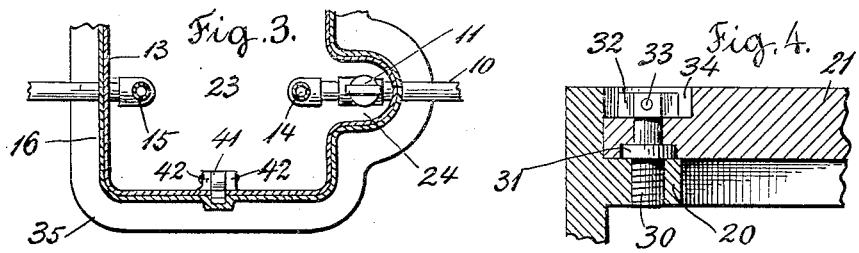
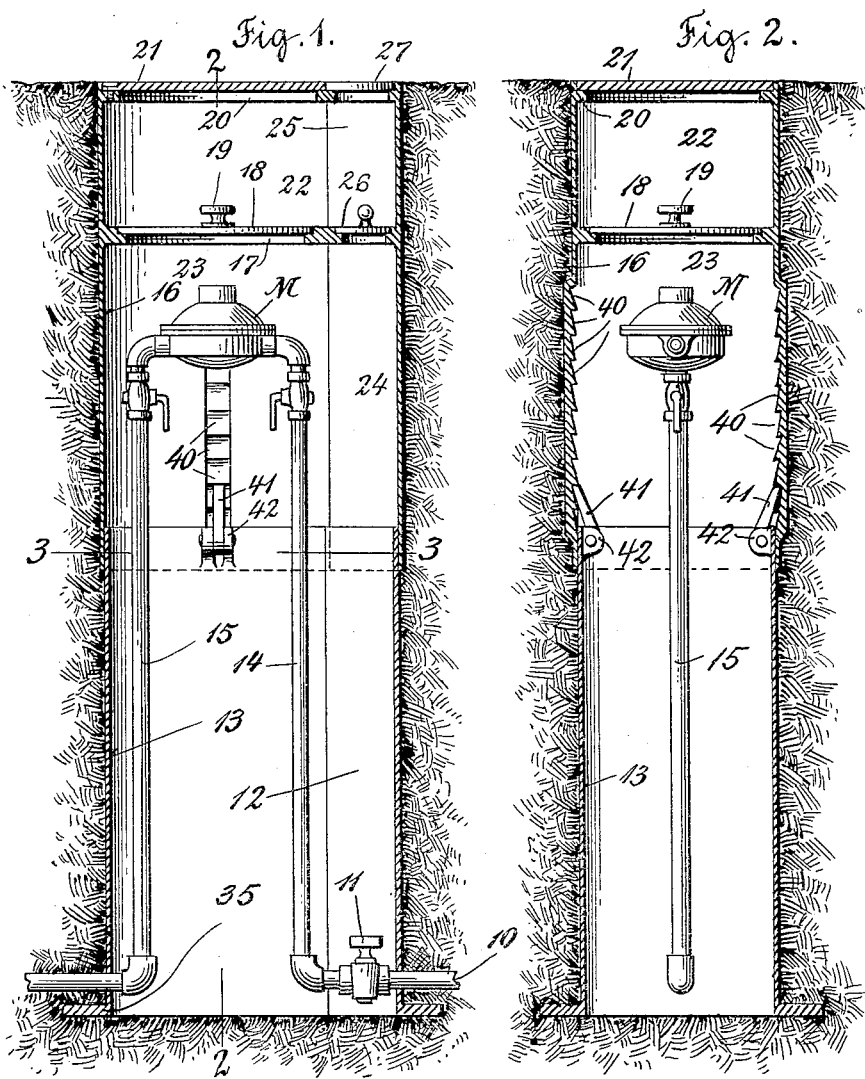
WITNESSES:
INVENTOR.
Thomas W. Felstead
BY
ATTORNEY.

UNITED STATES PATENT OFFICE.

THOMAS W. FELSTEAD, OF DETROIT, MICHIGAN.

METER-RECEPTACLE.

1,158,471.  Specification of Letters Patent.  Patented Nov. 2, 1915.

Application filed April 12, 1915.  Serial No. 20,931.

*To all whom it may concern:*

Be it known that I, THOMAS W. FELSTEAD, a citizen of the United States, residing at Detroit, county of Wayne, State of Michigan, have invented a certain new and useful Improvement in Meter-Receptacles, and declare the following to be a full, clear, and exact description of the same, such as will enable others skilled in the art to which it pertains to make and use the same, reference being had to the accompanying drawings, which form a part of this specification.

This invention relates to receptacles for meters and shut-off valves more particularly adapted for use with water meters located in the water mains exteriorly of a building, and the purpose of this invention is a means for protecting the meter and connecting parts from frost in a manner whereby it may be readily inspected by authorized persons.

A further object of the invention is a receptacle that is adjustable to accord with the depth at which the supply main is located in order that the top of the receptacle may be set level with the surface of the ground.

A further object is a receptacle formed of a plurality of sections in telescopic relation provided with means for maintaining the sections in adjusted position, the said sections being formed with a vertical channel to allow access to the shut-off valve without disturbing the meter.

These and other objects and novel features of the invention are hereinafter more fully described and claimed and shown in the accompanying drawings in which—

Figure 1 is a vertical section of a meter-receptacle embodying my invention. Fig. 2 is a similar section on line 2—2 of Fig. 1. Fig. 3 is a horizontal section on line 3—3 of Fig. 1. Fig. 4 is a detail of the cover fastening.

Similar characters refer to similar parts throughout the drawing and specification.

The supply-pipe connecting the street main and meter is indicated at 10 and is provided with a shut-off valve 11, disposed within and near the bottom of the vertical channel 12 formed on one side of the receptacle section 13. In the embodiment of the invention here shown the section 13 forms the lowermost section of the receptacle, the corresponding upper section 16 being in telescopic relation therewith and provided with a vertical channel 24 similar to the channel 12.

The meter M is sustained within the receptacle by the vertical pipes 14 and 15 connected with the opposite sides of the meter respectively, and to the supply line as indicated, and ordinarily the meter face is disposed about one and one-half feet below the surface of the soil in position for inspection. Means are also provided whereby the meter and the connections are protected from the influence of frost, which means preferably consists in the provision of an inclosed air space between the meter and the top of the receptacle.

As indicated in Fig. 1, the upper section 16 is provided with a ledge 17 extending across both the section and the companion channel 24, and adapted to receive the cover 18, which is provided with a knob 19 whereby it may be removed, and a similar small cover 26 disposed in the vertical channel as shown. At the extreme upper end, the section 16 is provided with a similar ledge 20 adapted to receive a cover 21 for the receptacle proper, and a cover 27 for the vertical channel. By this arrangement an air space 22 is provided which insulates the lower portion 23 of the casing from the cold of the atmosphere, and a similar air space 25 is provided in the channel between the top cover 27 and the cover 26. To shut off the water from the meter, the covers 26 and 27 may be removed whereupon the usual long-handled socket wrench may be inserted through the channels 12 and 24 for operation of the valve 11 without disturbing the covers 18 and 21 of the receptacle proper.

As the top covers 21 and 27 are exposed to the elements there is liability especially during cold weather that ice may form around the joint between the cover and the casing, and to facilitate the removal of the cover, especially the cover 21, I preferably employ the construction shown in detail in Fig. 4, in which a bolt 30 carried by the cover is in screw-threaded engagement with the upper ledge 20. The bolt 30 is provided with a shoulder 31 disposed on the inside of the cover 21 and fitting a recess provided therefor. The upper end of the bolt is provided with the usual square or polygon head 32 formed integrally with or secured to the bolt in any desired manner, as by a rivet 33, and this head is disposed within the recess 34 in the cover that is of sufficient size to allow the use of a socket wrench. It is evident that when the bolt 30 is turned in one direction the cover 31 will be clamped down and if turned in the opposite direction the shoulder 31 of the bolt will raise the cover. It is also to be understood that the cover 27 may be similarly provided with a bolt so that it may be opened without disturbing the cover 21.

As hereinbefore stated the receptacle is adapted for use with mains disposed at different depths in the ground, and for this reason the receptacle is preferably formed of a plurality of telescopic sections. In order to maintain the two sections in adjusted position the lower section 13 is provided with a base flange 35 by means of which it is firmly held at the bottom of the well, and the upper section is provided upon opposite sides with rack teeth 40 as indicated in Fig. 2, so disposed as not to interfere with the telescoping movement of the two sections. The lower section 13 carries a pair of pawls 41 pivoted to the said section at 42 and so disposed as to engage the rack teeth 40, in the manner indicated, and which tend to prevent a descent of the upper section relative to the lower section under any ordinary load that may be imposed thereon. By making the rack 40 of sufficient length various adjustments as to the length of the receptacle to accord with the depth of the well may be readily made.

It is to be understood that various changes may be made in the general design and arrangement of parts without departing from the spirit of this invention.

Having thus briefly described my invention and its utility, what I claim is—

1. A receptacle for a meter and its connections comprising upper and lower sections in telescopic relation, the lower section having an open externally flanged lower end and being apertured near said end to receive the meter connections, the upper compartment being provided with longitudinal racks on opposite sides of the interior, pawls pivotally mounted on the upper end of the lower section adapted to fall by gravity into engagement with the racks, channels formed in each of the sections in communication with the interior thereof providing a space at the side of the meter for insertion of a valve operating instrument, a cover for the upper section, and a cover for the channel therein.

2. A meter receptacle comprising a lower meter compartment, an air compartment above the meter compartment, a cover for each of the compartments, a channel formed at the side of the compartments and opening thereinto, and independent covers therefor providing an upper air space in the channel in communication with said air compartment.

3. A meter receptacle comprising a plurality of vertically adjustable sections each provided with a vertical channel upon the side thereof communicating throughout its length with the interior of the section, the upper section having a cover for the receptacle proper and a separate cover for the channel, a similar pair of covers spaced therebelow providing an air compartment in the upper end of the upper section and channel, and means for holding the sections in adjusted relation.

4. A meter receptacle comprising upper and lower sections in telescopic relation, the lower section having a laterally extending circumferential flange, a pair of racks formed in opposite sides of the upper section, pawls pivotally mounted on the lower section engaging the racks, a top cover for the upper receptacle, and a removable cover below said top cover providing an air space at the upper end of the upper section.

5. A meter receptacle comprising a plurality of vertically movable sections whereby the length of the receptacle may be varied, means for holding the sections in adjusted relation, the upper section having a top cover and a second cover therebelow providing an upper air space.

6. A meter receptacle comprising upper and lower sections in telescopic relation, each of said sections having a channel formed in the side thereof, the lower section having a laterally extending circumferential flange, a pair of covers at the top of said upper section for the section and channel respectively, and a similar pair of covers below the first named covers providing an air space at the upper end of said upper section, and means for holding the sections in adjusted relation.

7. A meter receptacle comprising upper and lower sections in telescopic relation, each of said sections having a channel formed in the side thereof, the lower section having a laterally extending circumferential flange, a pair of covers at the top of said upper section for the section and channel respectively, and a similar pair of covers below the first named covers providing an air space at the upper end of said upper section, a pair of racks formed on opposite sides of said upper section, and pawls pivotally mounted in the lower section engaging the racks.

In testimony whereof, I sign this specification.

THOMAS W. FELSTEAD.